United States Patent Office 3,829,498
Patented Aug. 13, 1974

3,829,498
PROCESS FOR PREPARING 5-HYDROXY-1-TETRALONE
Jerome D. Genzer, Livingston, and George A. Conrad, Irvington, N.J., assignors to Warner-Lambert Company, Morris Plains, N.J.
No Drawing. Continuation-in-part of abandoned application Ser. No. 146,852, May 25, 1971. This application Apr. 16, 1973, Ser. No. 351,227
Int. Cl. C07c 49/82
U.S. Cl. 260—590          5 Claims

ABSTRACT OF THE DISCLOSURE

An improved process for preparing 5-hydroxy-1-tetralone involving relatively mild reaction conditions uses 1,5-dihydroxynaphthalene as the starting material. An aqueous alcoholic solution of 1,5-dihydroxynaphthalene is allowed to react with one molar equivalent of gaseous hydrogen in the presence of a palladium reducing catalyst and an equimolar quantity of an alkali metal hydroxide. High yields of pure product are obtained.

CROSS REFERENCE TO RELATED APPLICATION

This application is a continuation-in-part of our co-pending U.S. Application Ser. No. 146,852, filed May 25, 1971, and now abandoned.

BACKGROUND OF THE INVENTION

This invention relates to an improved process for preparing 5-hydroxy-1-tetralone. More particularly, this invention relates to an improved method for preparing 5-hydroxy-1-tetralone from 1,5-dihydroxynaphthalene by subjecting an aqueous alcoholic solution of 1,5-dihydroxynaphthalene to catalytic reduction with hydrogen in the presence of an alkali metal hydroxide.

5-Hydroxy-1-tetralone, prepared by the proces of this invention, has the formula I below:

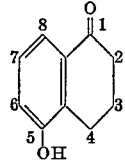

I

This product is useful as an intermediate in the preparation of certain 3,4-dihydro-naphthalenoneoxy-2-hydroxypropylamines.

These 3,4 - dihydro-naphthalenoneoxy-2-hydroxy-propylamines have the formula II below:

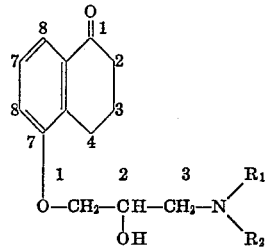

II wherein $R_1$ is hydrogen or lower alkyl of 1 to 6 carbon atoms and $R_2$ is lower alkyl of 1 to 6 carbon atoms. Such compounds may also be named as follows:

5-[3-(alkyl-substituted-amino)-2-hydroxypropoxy]-1-tetralones
5-[3-(alkyl-substituted-amino)-2-hydroxypropoxy]-3,4-dihydro-1(2H)-naphthalenones
1-(alkyl-substituted-amino)-3-[(1-2,3,4-tetrahydro-1-oxo-5-naphthyl)oxy]-2-propanols.

The 3,4-dihydro-naphthalenoneoxy-2-hydroxy-propylamines, as disclosed in U.S. Ser. No. 761,857, filed Sept. 23, 1968, now Pat. No. 3,641,152, have β-adrenergic blocking activity. In this last mentioned patent application, the compounds are described as showing activity when administered by injection or orally in mammals such as dogs, cats, monkeys and the like. For example, the β-adrenergic blocking activity of the 3,4-dihydro-naphthalenoneoxy-2-hydroxy-propylamines can be demonstrated by the administration of various doses of isoproterenol after dosage of the test animal with the active compound. The usual heart contractile force and heart rate response to isoproterenol is blocked by the 3,4-dihydro-naphthalenoneoxy-2-hydroxy-propylamines in varying degrees, depending on the doses administered. As an example of the β-adrenergic blocking activity of compounds having the formula II above, the compound 5-[3-(tert.-butylamino)-2-hydroxypropoxy]-1-tetralone hydrochloride was administered intravenously to anesthetized dogs at a dose of 6.7 μg./kg. The dogs were then given 0.3 μg./kg. isoproterenol. The active compound was capable of suppressing 50% of the isoproterenol effects on the dog's heart rate.

These compounds may be used wherever β-adrenergic blocking agents, such as, for example propanolol, are indicated: in conditions such as angina pectoris, cardiac arrythmia and other ischemic states.

While the dosage regimen may be varied according to the age, sex, body weight and species of the mammal being treated, it is generally in the range of about 0.1 to about 1 mg./kg. of body weight, administered orally or by injection.

As disclosed in the above mentioned U.S. Ser. No. 761,857, the 3,4-dihydro-naphthalenoneoxy-2-hydroxy-propylamines are prepared by reacting 5-hydroxy-1-tetralone with either compound III or IV below:

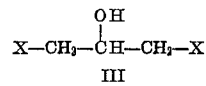   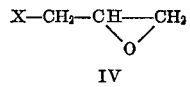

III                IV wherein X is halogen such as chlorine, to yield intermediate compounds V and VI, respectively, below:

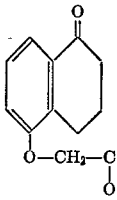   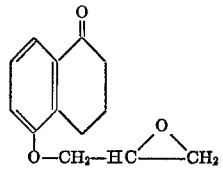

V            VI

The intermediate compounds V or VI may then be treated for example by refluxing, with an appropriate amine of the formula $NHR_1R_2$, wherein $R_1$ and $R_2$ have the same meaning stated above for Formula II to yield the desired 3,4-dihydronaphthalenoneoxy-2-hydroxy-propylamines.

According to U.S. Ser. No. 761,857, the 5-hydroxy-1-tetralone starting material for preparing the desired 3,4-dihydro-naphthalenoneoxy-2-hydroxypropylamines is obtained by treating the corresponding ether, which is commercially available, with hydrobromic acid in acetic acid.

Additional prior art methods for obtaining 5-hydroxy-1-tetralone are also known. For example, Papa, D. Schwenk, E. and Breiger, H., in J. Organic Chemistry 14: 366–374 (1949), describe the preparation of 5-hydroxy and 6-hydroxy-α-tetralone from 1,5- and 1,6-dihydroxytetralins, respectively, using a Raney alloy reduction procedure. In this process the 6-hydroxy-α-tetralone can be recovered quantitatively, but only poor yields of the 5-hydroxy-α-tetralone are obtained and even then, only as the 5-methoxy ether derivative. Thus, in order to prepare necessary 5-hydroxy-1-tetralone starting material, the procedure described above in U.S. Ser. No. 761,857 must still be employed, i.e. reaction with hydrobromic acid in acetic acid to cleave the ether group and obtain the corresponding 5-hydroxy group, which will react with appropriate intermediates to form the desired 3,4-dihydronaphthalenoneoxy-2-hydroxy-propylamines. This cleavage of the ether derivative, using hydrobromic acid in acetic acid, is a fairly tedious procedure and generally involves subsequent purification processing to isolate a suitable product.

Lockett, J. and Short, W. F., in J. Chem. Society, 787–790 (1939), describe the preparation of 5-methoxy-1-tetralone (named as 1-keto-5-methoxy-1,2,3,4-tetrahydronaphthalene) from coumarin by a lengthy, multi-step procedure. Thus, as in the above mentioned Papa et al. method, the 5-methoxy-1-tetralone is obtained; this product must be reacted with hydrobromic acid in acetic acid, and further purified to yield the desired 5-hydroxy-1-tetralone.

With respect to general prior art methods for cleaving of phenolic ethers to obtain the corresponding alcohol substituent, there may also be mentioned the method of Curphey, T. J., Hoffman, E. J., and McDonald, C., reported in Chemistry and Industry, pg. 1138 (July, 1967). In this method, a mixture of pyridine and a slight excess of concentrated hydrochloric acid is distilled until the internal temperature reaches 210° C.; upon the addition of a phenolic ether to these hot salts, the rapid formation of phenol results. The phenol product must be separated from the reaction mixture and purified. Thus, even this improved procedure for obtaining a hydroxy-substituent from an ether derivative is fairly intricate and requires purification procedures.

While the above mentioned prior art methods provide adequate procedures for preparing 5-hydroxy-1-tetralone, certain disadvantages in each of these processes are evident. For example, the previously used ether derivative starting materials are relatively costly. In addition, the use of such starting materials require a number of rather tedious processing steps in order to prepare the above-described, 3,4 - dihydro-naphthalenoneoxy-2-hydroxy-propylamines.

SUMMARY OF THE INVENTION

An aqueous alcoholic solution of 1,5-dihydroxynaphthalene is allowed to react with one molar equivalent of gaseous hydrogen in the presence of a palladium reducing catalyst and an equimolar quantity of an alkali metal hydroxide, to give high yields of relatively pure 5-hydroxy-1-tetralone.

DESCRIPTION OF THE INVENTION

It has now been found that 5-hydroxy-1-tetralone of high purity can be prepared in high yields by catalytic reduction of the relatively inexpensive and readily available starting material, 1,5-dihydroxynaphthalene. The improved process of this invention requires only relatively mild reaction conditions wherein an aqueous alcoholic solution of the 1,5-dihydroxynaphthalene starting material is subjected to catalytic reduction in the presence of gaseous hydrogen and an alkali metal hydroxide until one molar equivalent is absorbed. The purity of the 5-hydroxy-1-tetralone product obtained, which is in the range of 90% to 95%, is such that, after removal of the catalyst, it is not necessary to purify or further isolate the 5-hydroxy-1-tetralone product before initiating additional reactions, i.e., with either the dihalopropanol (III) or the epichlorohydrin (IV), in order to yield intermediate compounds V or VI, respectively. As described above, intermediate compounds V or VI are then further treated with an appropriate amine to provide the desired 3,4-dihydronaphthalenoneoxy-2-hydroxy-propylamines having β-adrenergic blocking activity.

In the catalytic reduction process of this invention, the 1,5-dihydroxynaphthalene starting material is suspended in an aqueous alcoholic solution. Lower alcohols, which are miscible with water, are suitable for this purpose. Alcohols having from 1 to 3 carbon atoms are preferred, and among these, isopropyl alcohol is particularly preferred. The amount of alcoholic solution used is not critical provided there is a sufficient amount to form a slurry with the amount of 1,5-dihydroxy-naphthalene starting material present in the reaction mixture.

The reducing catalyst used in the improved process of this invention is palladium, either on a suitable carrier or in free form. Suitable carriers for the palladium reducing catalyst are barium sulfate, calcium carbonate, or a carbonaceous carrier such as wood charcoal or bone charcoal. Palladium black, a powdered form of palladium, is also effective as the catalyst in the improved process of this invention. From about 0.156% to about 8% by weight of palladium catalyst, based on the weight of the starting 1,5-dihydroxynaphthalene is required in the reaction medium for the improved process of this invention. Palladium alone or on one of the above-mentioned carriers containing from 1% to 30%, preferably 5% to 10% of palladium is used in appropriate quantities to provide the necessary amount of reducing catalyst for the reaction. The amount of catalyst used may vary depending on the scale of the reaction and the equipment used to carry out the reduction. From a commercial point of view, palladium on a carbonaceous carrier is the preferred catalyst for the improved process of the invention; a 10% palladium catalyst on a carbonaceous carrier is particularly preferred.

It has also been found that, in order to achieve the high yields and desired purity in the product of the invention, it is necessary that the reducing reaction be conducted in the presence of an equimolar quantity of an alkali metal hydroxide such as sodium or potassium hydroxide, based on the initial amount of 1,5-dihydroxynaphthalene starting material.

The hydrogen uptake must be limited to approximately one molar equivalent of gaseous hydrogen, based on the starting 1,5-dihydroxynaphthalene and continuous stirring of the reaction mixture is necessary. The hydrogen pressure on the reaction is not particularly critical and may be varied from about 15 pounds per square inch to about 400 pounds per square inch (gauge pressure) during the reaction. Higher pressures are preferred, since the reaction is more rapid. The temperature may also be varied from about 30° C. to about 90° C., preferably from about 70° C. to about 90° C. Again, the higher temperatures speed up the reaction, and are therefore preferable.

Quite surprisingly, the reaction conditions of this invention have been found to provide yields of 5-hydroxy-1-tetralone of from 85 to 95% and a product purity of from 90 to 95%. In view of prior art processes, these yields and the purity of the final product are most unexpected. This, coupled with the relatively mild reaction conditions is particularly advantageous. Further, the low cost and availability of the 1,5-dihydroxynaphthalene starting material and the ability to conduct subsequent synthesis steps without the need for isolation and purification of the 5-hydroxy-1-tetralone product does provide a much improved route to the physiologically active 3,4-dihydronaphthalenoneoxy-2-hydroxypropylamines.

The following examples are included in order to further illustrate the present invention.

EXAMPLE 1

48 grams of 1,5-dihydroxynaphthalene, 12 grams of sodium hydroxide, 30 ml. of water, 235 ml. of isopropyl alcohol and 7.5 grams of a 10% palladium on carbon catalyst is allowed to react in a Parr shaker to which gaseous hydrogen is introduced at pressures of up to 52 pounds per square inch. A temperature of 70° C. to 90° C. is maintained during the reaction. When one molar equivalent of hydrogen gas is absorbed, the reaction mixture is cooled to 25° C. and vented. Water is added to solublize any solids resulting from crystallization and the reaction mixture is warmed to 50° C. The catalyst is removed from the reaction mixture by filtering in vacuo through Super-Cel and washed with water. The remaining solution is treated with boneblack in the usual manner and stripped in vacuo at below 60° C., until no more alcohol distills over. The remaining aqueous solution is acidified with concentrated hydrochloric acid to a pH of 2 preferably while at a temperature of approximately 25° C. The resulting solids are filtered off, washed with water and dried to a constant weight at 60° C. The yield of greenish-tan product, melting at 194° C.–196° C., is about 89%. Typical purity of the isolated 5-hydroxy-1-tetralone product is about 95%.

EXAMPLE 2

Preparation of 5-hydroxy-1-tetralone 600 grams of 1,5-dihydroxynaphthalene, 150 grams of sodium hydroxide, 375 ml. of water, 2938 ml. of isopropyl alcohol and 93.8 grams of 10% palladium on carbon catalyst are allowed to react in a stirred, high pressure autoclave to which gaseous hydrogen is introduced at pressures of from 30–250 pounds per square inch. A temperature of from 70° C. to 90° C. is maintained during the reaction. When one molar equivalent of hydrogen gas is absorbed, the reaction mixture is cooled to 45° C. and vented. In order to remove the catalyst, the reaction mixture is re-warmed to 70° C., after which 500 ml. of water is added. The temperature drops to 50° C. after the addition of the water. The catalyst is removed from this reaction mixture by filtering in vacuo through Super-Cel; it is then washed with 218 ml. water and 2800 ml. isopropanol is added. The final reaction mixture now contains the required ratios of isopropanol and water for the next step, namely the preparation of 5-(2,3-epoxypropoxy)-1-tetralone (B).

EXAMPLE 3

Following the procedure of Example 1, 16 grams of 1,5-dihydroxynaphthalene is reduced using 5 grams of 5% palladium on barium sulfate as the catalyst. An 86% yield of 5-hydroxy-1-tetralone having a purity of approximately 92% is obtained.

EXAMPLE 4

Following the procedure of Example 1, 16 grams of 1,5-dihydroxynaphthalene is reduced using 5 grams of 5% palladium on calcium carbonate. A 79% yield of 5-hydroxy-1-tetralone having a 84% purity is obtained.

EXAMPLE 5

Following the procedure of Example 1, 16 grams of 1,5-dihydroxynaphthalene is reduced using 1.25 grams of palladium black. A yield of approximately 91% of 5-hydroxy-1-tetralone having a purity of 90% is obtained.

We claim:

1. A process for preparing 5-hydroxy-1-tetralone which comprises allowing a lower aqueous alcohol solution of 1,5-dihydroxynaphthalene to react with gaseous hydrogen in the presence of a palladium reducing catalyst and an equimolar quantity of an alkali metal hydroxide until one molar equivalent of hydrogen has been absorbed, said reaction being conducted at a temperature of from about 30° C. to about 90° C., with a hydrogen pressure of from about 15 pounds to about 400 pounds per square inch on the reaction.

2. A process according to Claim 1 wherein the reducing catalyst is palladium on a carbonaceous carrier.

3. A process according to Claim 2 wherein the reaction is carried out at a temperature of from about 70° C. to about 90° C.

4. A process according to Claim 3 wherein the alkali metal hydroxide is sodium hydroxide.

5. A process according to Claim 3 wherein the solution of 1,5-dihydroxynaphthalene is an aqueous isopropyl alcohol solution.

References Cited

UNITED STATES PATENTS

| | | | |
|---|---|---|---|
| 2,475,718 | 7/1949 | Papa et al. | 260—590 |
| 2,526,859 | 10/1950 | Foreman et al. | 260—590 |

DANIEL D. HORWITZ, Primary Examiner

U.S. Cl. X.R.

260—570.7, 348.6; 424—330

UNITED STATES PATENT OFFICE
CERTIFICATE OF CORRECTION

Patent No. 3,829,498    Dated August 13, 1974

Inventor(s) Jerome D. Genzer and George A. Conrad

It is certified that error appears in the above-identified patent and that said Letters Patent are hereby corrected as shown below:

Column 1, formula II, that portion of the formula reading

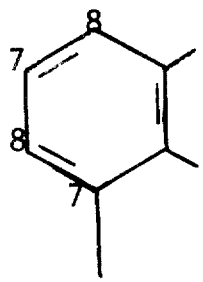   should read   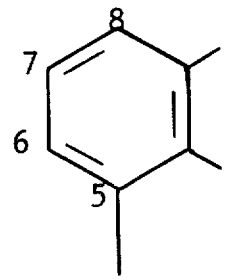

Signed and sealed this 5th day of November 1974.

(SEAL)
Attest:

McCOY M. GIBSON JR.
Attesting Officer

C. MARSHALL DANN
Commissioner of Patents